April 21, 1953     D. W. SIEBERT     2,635,797

BAG ATTACHMENT FOR BABY CARRIAGES

Filed March 14, 1950

INVENTOR.
DONALD W. SIEBERT
BY
Owen W. Kennedy
ATTORNEY

Patented Apr. 21, 1953

2,635,797

UNITED STATES PATENT OFFICE 2,635,797

BAG ATTACHMENT FOR BABY CARRIAGES

Donald W. Siebert, Gardner, Mass., assignor to O. W. Siebert Company, Gardner, Mass., a corporation of Massachusetts Application March 14, 1950, Serial No. 149,560

2 Claims. (Cl. 224—42.46)

The present invention relates to an attachment for children's vehicles, such as baby carriages, strollers, and the like, and has for its object to provide an improved attachment in the form of a shopping or general utility bag that can be readily mounted on the pusher bar of any conventional children's vehicle.

According to the present invention, a shopping bag, or other similar receptacle, is provided with a carrying handle so formed that the loaded bag can be hung from a pusher bar, which thereafter carries the weight of the load, without interfering with the operation of the vehicle. Furthermore, the handle for the bag is so formed, that the hands of the person pushing the vehicle will naturally tend to rest upon a portion of the handle, thus serving to steady the bag and prevent its swinging when the vehicle is in motion.

The above and other advantageous features of the invention will hereinafter more fully appear from the following description, considered in connection with the accompanying drawings, in which, Fig. 1 is a perspective view of the body portion of a baby carriage having a pusher bar to which my improved bag mounting has been applied.

Figure 1:
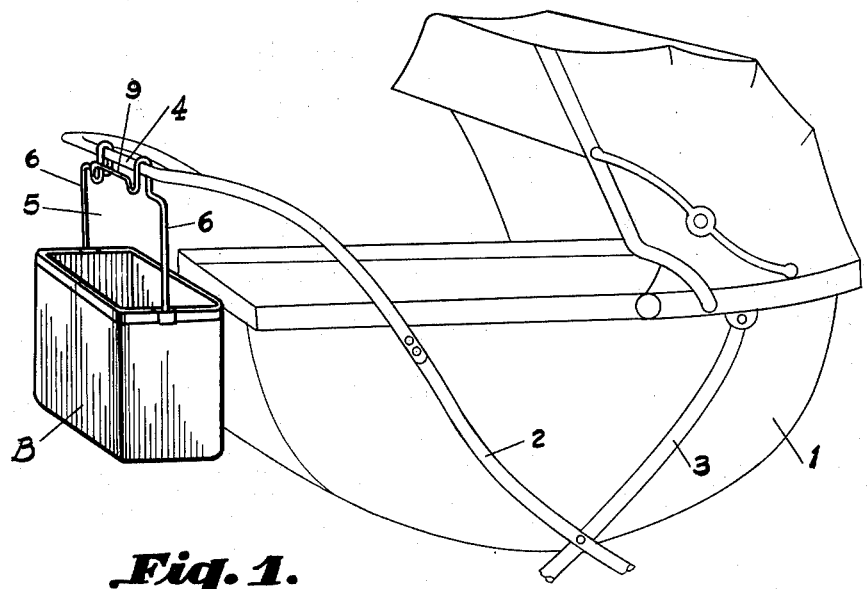
Figure 2:
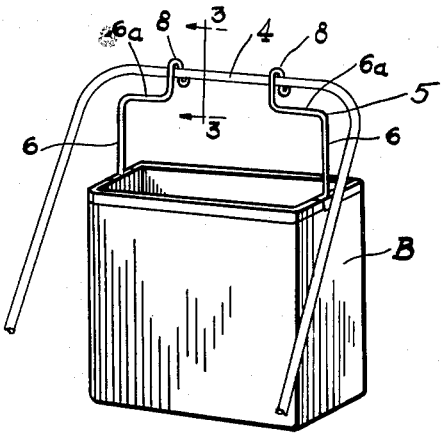
Fig. 2 is a perspective view showing the bag mounting of Fig. 1 on an enlarged scale, as viewed from inside the pusher bar.

Referring first to Figs. 1 and 2 of the drawings, the improved bag mounting of the present invention is shown for purposes of illustration, as being applied to a baby carriage of a conventional type, only a portion of which is shown. Such a baby carriage usually comprises a body 1 supported between pairs of side members 2 and 3, which extend below the body for connection to the frame of the running gear, which is not shown. A pusher bar 4 extends above the body 1, the bar 4 being of U-shape form for attachment at its lower ends to the side members 2. Substantially all children's vehicles, such as baby carriages, strollers, and the like, are provided with a pusher bar of this form, so as to provide a horizontal portion extending above the body at a convenient height for receiving the hands of a person pushing the vehicle.

As previously pointed out, the object of the present invention is to provide an improved mounting for a shopping or general utility bag, so constructed that it may be readily supported from the pusher bar of any children's vehicle. Such a mounting is shown in Figs. 1 and 2 as comprising a bag B of any desired form to which is attached a handle 5 of special construction, which permits the bag to be conveniently carried when being used for shopping, and other purposes, and then after the bag has been loaded, enables it to be readily hung from the pusher bar 4.

Figure 4:
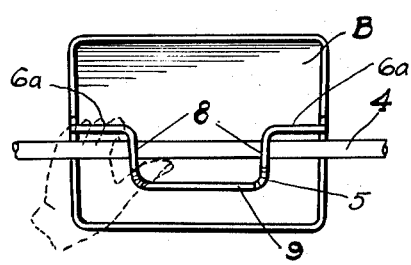
Fig. 4 is a plan view of the bag mounting.
Figure 3:
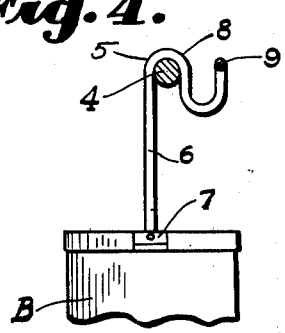
Fig. 3 is a vertical sectional view along the line 3—3 of Fig. 2, looking in the direction of the arrows.

As best shown in Figs. 3 and 4, the handle 5 is preferably formed from a single piece of metal rod bent to provide parallel arms 6 that are connected at their ends to a frame 7 extending around the top of the bag B. The upper portions of the arms 6 are bent inwardly towards each other, as at 6a, and then upwardly to provide spaced loops 8, so formed as to readily receive the horizontal portion of a baby carriage pusher bar 4. The loops 8 are connected together by a cross piece 9, which is offset from the pusher bar 4 by reversely bending the handle beyond the loops 8, so that the cross piece 9 is substantially at the same level as the pusher bar 4, although spaced laterally therefrom.

When the bag B is in use, the cross piece 9 of the handle 5 provides a convenient hand grip for carrying the bag, and when the bag has been loaded, it can be readily mounted on the pusher bar 4 of the baby carriage by lowering the handle until the loops 8 engage the pusher bar 4, whereupon the grip on the cross piece 9 can be released. Should the bag be heavily loaded, it will tend to swing back and forth when the carriage is in motion, and the offset cross piece 9 provides means whereby the entire bag can be steadied by the hands of a person pushing the carriage by the bar 4. Fig. 4 shows in dotted lines, a pair of hands as applied to the pusher bar 4, with the fingers gripping the bar outside the loops 8, and the thumbs naturally resting on the cross piece 9 inside the loops. As a result, downward pressure by the thumbs will tend to steady the bag B, when the carriage is in motion, by reason of the fact that the cross piece 9 is displaced from the horizontal portion of the bar 4, about the axis of which, the bag B tends to swing with the loops 8.

Figure 5:
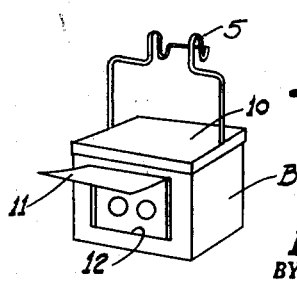
Fig. 5 shows a modified form of bag.

While the bag B has been described as being particularly adapted for use as a shopping bag, obviously it can be used for other purposes. Thus, the bag can be used as a receptacle for various items associated with the care of the occupant of the baby carriage, so that it can be left hanging on the pusher bar when the vehicle is not in use. Furthermore, the bag B can be made in a size convenient for carrying a portable radio, and the usefulness of the bag, when employed for this purpose, can be greatly increased by providing the top of the bag with a cover 10, and one side of the bag with a flap 11, which can be raised to expose an opening 12 to give access to the front of a radio, as indicated in Fig. 5.

I claim:

1. An attachment for children's vehicles of the type providing a horizontal pusher bar comprising in combination, a receptacle and a carrying handle for said receptacle, said handle having arms extending upwardly from the receptacle and being formed at their upper ends into hooks for engagement with the pusher bar, thereby permitting the receptacle to be hung from the bar, said handle further providing a crossbar connecting said hooks, said crossbar being offset from the pusher bar and extending parallel to and approximately level with said pusher bar, thus enabling the hands of the person pushing the vehicle to readily engage said crossbar and exert a downward pressure thereon.

2. An attachment for children's vehicles of the type providing a horizontal pusher bar comprising in combination, a receptacle and a carrying handle for said receptacle providing upwardly extending arms, each having a loop portion at its upper extremity for engaging said pusher bar, and another loop portion of reverse curvature extending from said first named loop portion, and with the reverse loops of said arms being connected by a crossbar extending between the ends thereof, said crossbar thereby being offset from and parallel to the pusher bar, and at approximately the same level as the pusher bar, thus enabling the hands of the person pushing the vehicle to readily engage said crossbar and by downward pressure thereon to exert a turning moment about the pusher bar on the handle and receptacle to steady the same.

DONALD W. SIEBERT.

References Cited in the file of this patent

UNITED STATES PATENTS

| Number | Name | Date |
|---|---|---|
| 1,176,598 | Pollgreen | Mar. 21, 1916 |
| 1,486,566 | Crecelius | Mar. 11, 1924 |
| 1,505,182 | Wrixton | Aug. 19, 1924 |
| 1,577,298 | Roeller | Mar. 16, 1926 |
| 1,875,107 | Mueller | Aug. 30, 1932 |
| 2,491,062 | Shephard | Dec. 13, 1949 |